(12) United States Patent
Estrada et al.

(10) Patent No.: US 11,462,007 B2
(45) Date of Patent: *Oct. 4, 2022

(54) SYSTEM FOR SIMPLIFIED GENERATION OF SYSTEMS FOR BROAD AREA GEOSPATIAL OBJECT DETECTION

(71) Applicant: DigitalGlobe, Inc., Longmont, CO (US)

(72) Inventors: Adam Estrada, Bethesda, MD (US); Kevin Green, Aldie, VA (US); Andrew Jenkins, Waterford, VA (US)

(73) Assignee: DIGITALGLOBE, INC., Longmont, CO (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/069,776

(22) Filed: Oct. 13, 2020

(65) Prior Publication Data

US 2021/0027040 A1 Jan. 28, 2021

Related U.S. Application Data

(63) Continuation of application No. 16/533,386, filed on Aug. 6, 2019, now Pat. No. 10,803,310, which is a
(Continued)

(51) Int. Cl.
*G06K 9/00* (2022.01)
*G06V 20/13* (2022.01)
(Continued)

(52) U.S. Cl.
CPC ........... *G06V 20/13* (2022.01); *G06K 9/6256* (2013.01); *G06K 9/6259* (2013.01); *G06K 9/6262* (2013.01); *G06K 9/6267* (2013.01); *G06N 3/04* (2013.01); *G06N 3/0454* (2013.01); *G06N 3/08* (2013.01); *G06T 7/73* (2017.01); *G06T 15/50* (2013.01); *G06T 17/05* (2013.01); *G06V 10/50* (2022.01); *G06V 20/176* (2022.01); *G06N 5/003* (2013.01); *G06N 7/005* (2013.01);
(Continued)

(58) Field of Classification Search
CPC ........... G06V 20/13; G06T 7/73; G06T 15/50; G06K 9/6256; G06K 9/6259; G06K 9/6262; G06K 9/6267; G06N 3/04; G06N 3/0454
See application file for complete search history.

(56) References Cited

U.S. PATENT DOCUMENTS 9,904,849 B2* 2/2018 Estrada ................ G06K 9/6262
10,372,985 B2* 8/2019 Estrada ................ G06K 9/6267
10,803,310 B2* 10/2020 Estrada ................ G06K 9/6267

* cited by examiner

*Primary Examiner* — Samir A Ahmed
(74) *Attorney, Agent, or Firm* — Galvin Patent Law LLC; Brian R. Galvin

(57) ABSTRACT

A system for simplified generation of systems for analysis of satellite images to geolocate one or more objects of interest. A plurality of training images labeled for a study object or objects with irrelevant features loaded into a preexisting feature identification subsystem causes automated generation of models for the study object. This model is used to parameterize pre-engineered machine learning elements that are running a preprogrammed machine learning protocol. Training images with the study are used to train object recognition filters. This filter is used to identify the study object in unanalyzed images. The system reports results in a requestor's preferred format.

2 Claims, 15 Drawing Sheets

Related U.S. Application Data continuation of application No. 15/906,348, filed on Feb. 27, 2018, now Pat. No. 10,372,985, which is a continuation of application No. 15/608,894, filed on May 30, 2017, now Pat. No. 9,904,849, which is a continuation-in-part of application No. 15/194,541, filed on Jun. 27, 2016, now Pat. No. 9,767,565, which is a continuation-in-part of application No. 14/835,736, filed on Aug. 26, 2015, now Pat. No. 9,589,210.

(60) Provisional application No. 62/301,554, filed on Feb. 29, 2016.

(51) Int. Cl.
*G06K 9/62* (2022.01)
*G06T 7/73* (2017.01)
*G06N 3/08* (2006.01)
*G06T 15/50* (2011.01)
*G06T 17/05* (2011.01)
*G06N 3/04* (2006.01)
*G06V 10/50* (2022.01)
*G06V 20/10* (2022.01)
*G06T 7/10* (2017.01)
*G06N 5/00* (2006.01)
*G06N 7/00* (2006.01)
*G06N 20/20* (2019.01)

(52) U.S. Cl.
CPC ............... *G06N 20/20* (2019.01); *G06T 7/10* (2017.01); *G06T 2207/10032* (2013.01); *G06T 2207/20081* (2013.01); *G06T 2207/20084* (2013.01); *G06T 2207/30181* (2013.01)

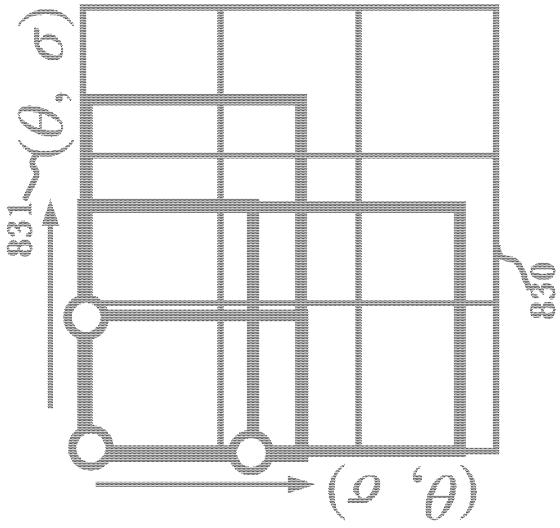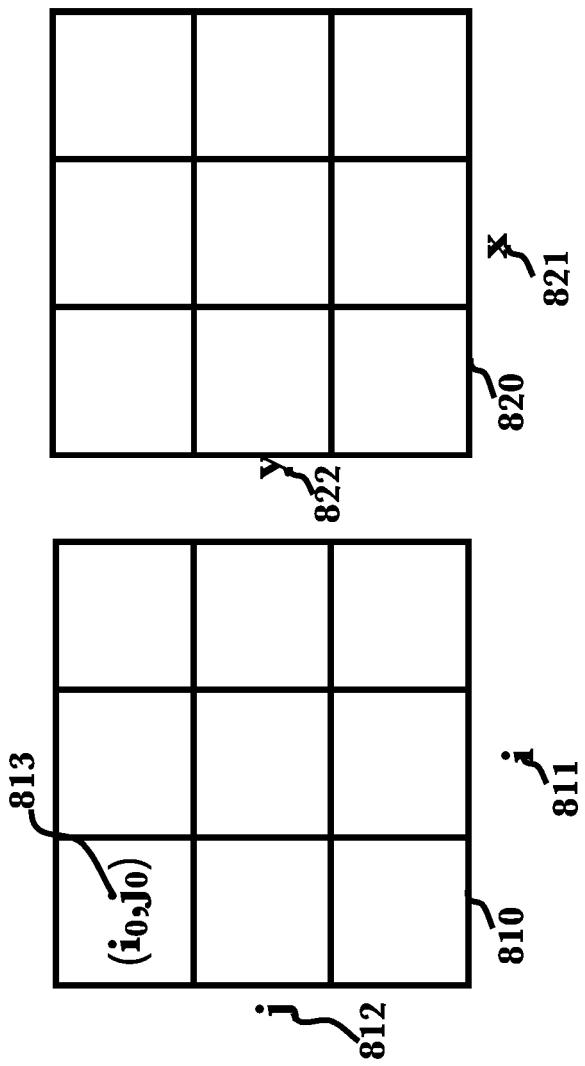
Fig. 8

SYSTEM FOR SIMPLIFIED GENERATION OF SYSTEMS FOR BROAD AREA GEOSPATIAL OBJECT DETECTION

CROSS-REFERENCE TO RELATED APPLICATIONS

| Application No. | Date Filed | Title |
|---|---|---|
| Current application | Herewith | A SYSTEM FOR SIMPLIFIED GENERATION OF SYSTEMS FOR BROAD AREA GEOSPATIAL OBJECT DETECTION Is a continuation of: |
| 16/533,386 | Aug. 6, 2019 | A SYSTEM FOR SIMPLIFIED GENERATION OF SYSTEMS FOR BROAD AREA GEOSPATIAL OBJECT DETECTION which is a continuation of: |
| 15/906,348 U.S. Pat. No. 10,372,985 | Feb. 27, 2018 Issue Date Aug. 6, 2019 | SYSTEM FOR SIMPLIFIED GENERATION OF SYSTEMS FOR BROAD AREA GEOSPATIAL OBJECT DETECTION which is a continuation of: |
| 15/608,894 U.S. Pat. No. 9,904,849 | May 30, 2017 Issue date Feb. 27, 2018 | SYSTEM FOR SIMPLIFIED GENERATION OF SYSTEMS FOR BROAD AREA GEOSPATIAL OBJECT DETECTION which is a continuation-in-part of: |
| 15/194,541 U.S. Pat. No. 9,767,565 | Jun. 27, 2016 Issue date Sep. 19, 2017 | SYNTHESIZING TRAINING DATA FOR BROAD AREA GEOSPATIAL OBJECT DETECTION which claims benefit of, and priority to: |
| 62/301,554 | Feb 29, 2016 | SYNTHESIZING TRAINING DATA FOR BROAD AREA GEOSPATIAL OBJECT DETECTION and is also a continuation-in-part of: |
| 14/835,736 U.S. Pat. No. 9,589,210 | Aug. 26, 2015 Issue date Mar. 7, 2017 | BROAD AREA GEOSPATIAL OBJECT DETECTION USING AUTOGENERATED DEEP LEARNING MODELS | the entire specification of each of which is incorporated herein by reference.

BACKGROUND OF THE INVENTION

Field of the Art

The present invention is in the field of image analysis, and more particularly in the field of the use of deep learning model computer vision systems for automated object identification from geospatial imagery.

Discussion of the State of the Art

Image analysis has been an important field of technology at least since the period of World War 2, when extensive use of image analysis, photogrammetry, and related technologies were used in conjunction with aerial photography for intelligence and bombing damage assessment purposes (among others). However, the extent of the use of image analysis (particularly image analysis of remotely-sensed images), particularly for identifying or locating targets of interest, has always been limited by the need for highly-trained, specialized image analysts or interpreters. The need for specialized (and expensive) skills has limited the use of image analysis to a correspondingly limited range of applications (notably military, homeland defense, and law enforcement).

The market for image analysis has also historically been limited by the high cost of obtaining images to analyze. In the military arena, the benefits were sufficiently apparent that large numbers of military reconnaissance flights have been made over regions of interest since World War 2. But the cost of such flights virtually excluded all commercial applications of image analysis. Starting in the 1970s with the Landsat satellite, conditions began to change as low resolution satellite images became publicly available. A series of new satellites has allowed for progressively more applications for quality geospatial imagery as the resolution, spectral coverage, geographic coverage, and cost per image have all continuously improved; accordingly, a significant market in commercial remote sensing imagery has emerged. Unfortunately, even this market has been limited from achieving its full potential because of the still-present requirement for expensive, scarce image analysis talent.

One common type of geospatial image analysis task is the "search and locate" task. In this task, one or more targets of interest need to be identified and precisely located. A well-known example of "search and locate" is the discovery and pinpointing of warships, tanks, or other military targets of interest. Recently, focused geospatial image analysis of geographically specific data has been used for search and rescue efforts of downed planes or lost shipping. However, these efforts have required the work of image analysts, significantly limiting the extent of the search. Development of a method to identify targets of interest more rapidly, using less resources would allow the pursuit of less urgent but promising applications which include assessing the scope of a refugee crisis by for example counting tents in an area of interest, analyzing the change in infrastructure in developing nations, assessing numbers of endangered species, finding military hardware in areas previously not expected to comprise such equipment, identifying previously unknown airstrips or camps where crime or terrorism may be in operation. The ability to extend "search and locate" like tasks to large geological areas and efficiently perform them repetitively over time would allow the use of geospatial imagery to map remote regions, to track deforestation and re-forestation and to detect natural disasters in remote areas of the world.

The notion of computer vision, specifically the reliable identification by a computer of particular objects has been an active pursuit within the field of computer science since the late 1960s. Unfortunately, until recently, this pursuit has met with little success except when both the object of interest and the background against which it is presented have been tightly controlled. Barriers to advancement in computer object identification have been both technological and logical. The technological barriers have been present because, like its biological counterpart, computer visual processing requires computational power and amounts of memory storage that have been prohibitive up until the last 15 years. Advancement in the ability to pack more transistors into the same volume while also reducing cost and the development of such specialized components as the graphics processing unit, which is optimized to perform calculations encountered during manipulation of visual data has brought current hardware to the point where rapid, even real time, object identification is possible. There has also been a significant maturation process in how computer scientists in the field program computers to analyze objects of interest. Some early methods have been to break each object of interest into a unique grouping of simple geometric shapes or to take advantage of unique shading patterns of each object to identify new instances of the desired object. All of these early attempts gave results that were extremely sensitive to such variables as lighting, exact object placement in the field of sample, and exact object orientation, sometimes to the degree that the object of interest was not identifiable in the original image without great care. Currently, after great advancement in computer capabilities, advances in our understanding of biological vision, and advances in computer vision theory, methods of training computers to reliably identify specific objects of interest has emerged. One extensively used method combines a convolutional neural network with deep learning to train the system to recognize an existing object of interest both when presented against many backgrounds and when the object is in different orientations. The convolutional neural network which consists of several layers of filters with partial, local field interconnections between layers interspersed with data complexity reduction pooling layers affords computer learning of object recognition with a minimum of pre-supposition on the part of the programmer as the convolutional neural network determines the best filters to employ to identify the target object. Deep learning consists of a period of "supervised learning" which uses a moderate sized set of training images where each image comprises an example of the object to identify, for example, the human face, which is clearly demarcated or "labeled" followed by a period of "unsupervised learning" on a very large number of unlabeled images, a portion of which do not have the object to identify present in them. The number of training images is proportional to the overall system's accuracy, specifically the precision and recall of the classification results. Accordingly, the number of training images is inversely proportional to the amount of time the convolutional neural network—deep learning model spends training and further, searching and accurately finding objects of interest. This convolutional neural network deep learning model method has given rise to computer systems that have been reliably used in human facial recognition, optical character recognition, and identification of complex sets of parts during manufacturing. Indeed, the convolutional neural network-deep learning model method has been found so widely useful for object identification that there are multiple programming libraries now publicly available for download and use for that purpose. These include, for example, the Caffe library (BerkeleyVision and Learning Center), the Torch7 library (Nagadomi) and the cuda-covnet2 library (Alex Krizhevsky). Very recently the convolutional neural network—deep learning model has begun to be applied to the field of object identification and classification in orthorectified geospatial images as set forth in U.S. Pat. No. 9,589,210 to Estrada, A et al. Despite this inroad into the use of automated computer system mediated object identification, which promises to significantly reduce cost of geospatial image analysis for identification of specific objects of interest, the creation of the trained computer system remains labor intensive as the needed software engineering must be largely repeated for each object of interest. While the existing automated geospatial object classification system is a significant advancement, the remaining requirement to create each geospatial object classification system de novo reduces classification system generation efficiency and drives up cost, restricting usefulness from some worthwhile applications.

What is needed in the art is an automated system that generates synthetic training images to augment the number of real training images needed for an automated system to both identify and determine the precise location of a number of objects of interest from geospatial imagery.

SUMMARY OF THE INVENTION

The inventor has developed an engine for simplified generation of systems for analysis of satellite images to geolocate one or more targets of interest, or to identify objects or their types.

According to an aspect, a pre-existing framework of reusable modules may drive the selection of unique features of an object of interest from a plurality of orthorectified geospatial training images where the object of interest is clearly demarcated and a second plurality of orthorectified geospatial training images where objects bearing features that are to be excluded from the generation of one or more feature model for the object of interest are clearly labeled. A generated feature model may then be used to seed a second pre-existing framework, which comprises at least one machine learning object classifier elements each pre-programmed to run one of the known machine learning protocols. Using feature model as one set of parameters the second framework accepts a large plurality of geospatial training images comprising the object of interest, either demarcated or unlabeled to train the system to reliably and reproducibly identify the object of interest. Late in the training stage of this machine learning classifier element framework, geospatial images without instances of the object of interest may be submitted to further test classification specificity. A third framework may accept the engineered, object of interest trained, machine learning classifier module for use in identifying instances of the object of interest within resolution scale matched but unanalyzed production geospatial images. Classification results from search and locate campaign for the object of interest may be presented to the campaign author in a pre-determined format according to the specifications of the campaign. The aspect greatly reduces the time and programming knowledge needed to run a search and locate campaign for one or more specific search objects by using pre-existing pre-programmed frameworks for the stages of system preparation known to the art.

According to an aspect, a system for simplified generation of systems for broad area geospatial object detection comprising: an object model creation module comprising a processor, a memory, and a plurality of programming instructions stored in the memory and operable on the processor, wherein the plurality of programming instructions: retrieves a plurality orthorectified geospatial images where an object of interest has been demarcated from an established data store, retrieves a plurality of orthorectified geospatial images where objects that are not the object of interest, at least one of which closely resembles the object of interest have been demarcated from an established data store, programmatically isolates features found in the object of interest but not in the irrelevant training objects, creates at least one object of interest identification model using the features unique to the object of interest; and a machine learning classifier element training and verification module comprising a processor, a memory, and a plurality of programming instructions stored in the memory and operable on the processor, wherein the plurality of programming instructions: accepts at least one identification model, retrieves a plurality of labeled and unlabeled orthorectified geospatial training images comprising the object of interest, trains at least one pre-engineered machine learning classifier element each running a pre-programmed machine learning protocol parameterized with one identification model using the plurality of labeled and unlabeled orthorectified geospatial training images comprising the object of interest, confirms specificity of trained machine learning classifier element for the object of interest using a plurality of unlabeled orthorectified geospatial training images comprising the object of interest and a plurality of unlabeled orthorectified geospatial training images that do not contain the object of interest and a model mediated object classification module comprising a processor, a memory, and a plurality of programming instructions stored in the memory and operable on the processor, wherein the plurality of programming instructions: retrieve the trained machine learning element for the object of interest analyze a plurality of resolution scale corrected, unanalyzed orthorectified geospatial image segments for presence of at least one objects of interest, reports the results of a predetermined orthorectified geospatial image survey for the object of interest in a report format predirected by a survey author.

According to another aspect, a method for simplified generation of systems for broad area geospatial object detection the step comprising: (a) retrieving a plurality of color and spectrally optimized geospatial training images comprising an object of interest that is clearly labeled and a second plurality of color and spectrally optimized geospatial training images that do not contain the object of interest to isolate a set of visual features unique to the object of interest using an pre-engineered object model creation module comprising a processor, a memory, and a plurality of programming instructions stored in the memory and operable on the processor; (b) employing the set of visual features unique to the object of interest to parameterize at least one pre-engineered machine learning classifier element running at least one pre-programmed machine learning programming protocol using a machine learning classifier element training and verification module comprising a processor, a memory, and a plurality of programming instructions stored in the memory and operable on the processor; (c) training pre-engineered machine learning classifier elements to identify the object of interest using a plurality of training geospatial images with the object of interest labeled in one subset and not labeled in a second subset within the machine learning classifier element training and verification module; (d) refining and confirming the fine specificity of trained machine learning classifier elements for the object of interest to the exclusion of other objects using geospatial training images not containing the object of interest, some of which comprise other irrelevant objects; and (e) analyzing previously unanalyzed, scale corrected geospatial images for presence of the object of interest using trained machine learning classified element and reporting the results of the study in a format pre-determined by the study author.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a diagram that illustrates the use of a sliding window module to translate the coordinate system used within the cache of geospatial images being analyzed and the geographical longitude and latitude system as part of the automated system for geospatial image analysis of the invention.

DETAILED DESCRIPTION

Figure 1:
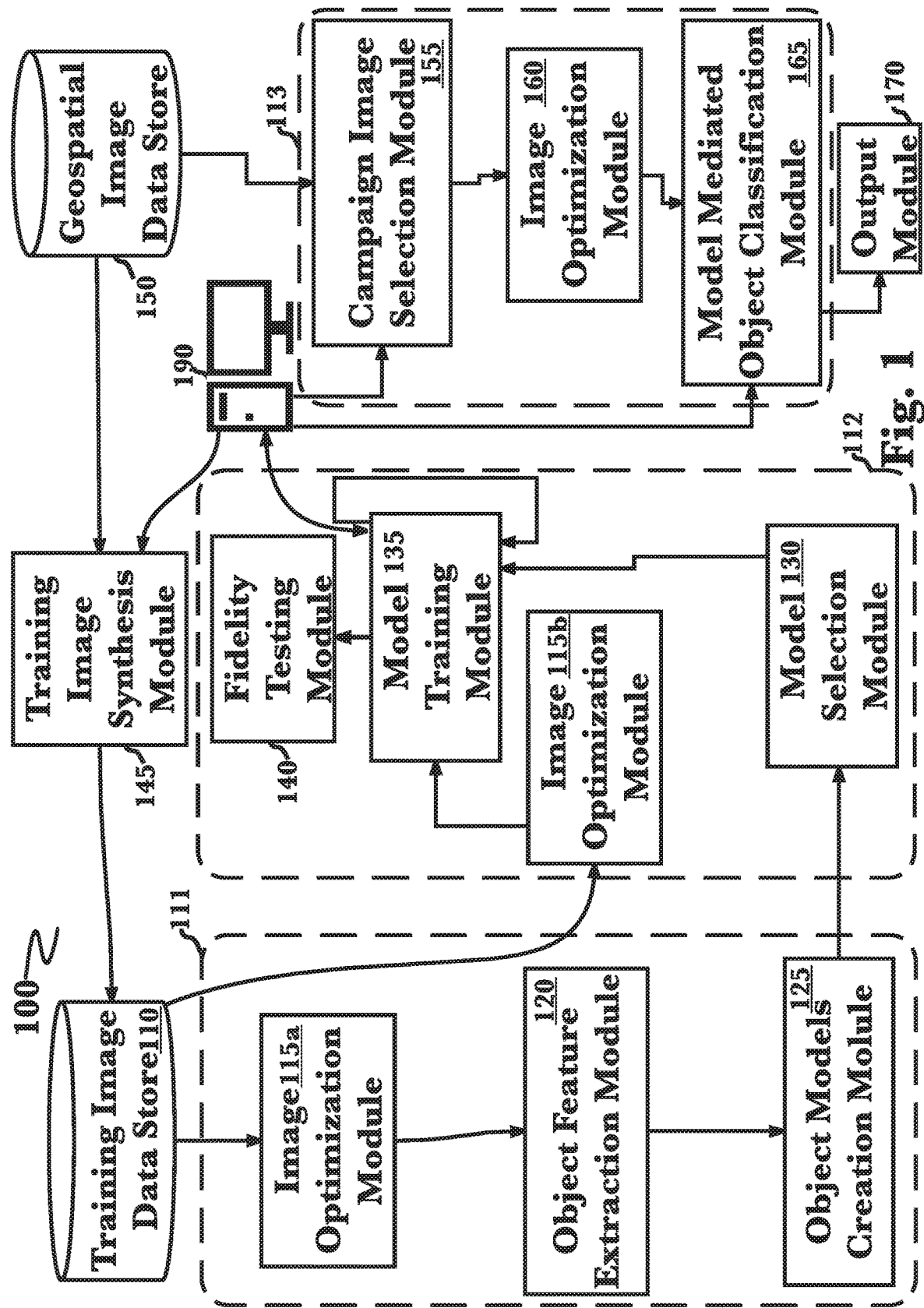
FIG. 1 is a diagram of an exemplary architecture for a software engineered engine for simplified generation of systems for automated classification of objects in broad area geospatial images that uses the deep learning model and machine learning classifiers, according to an aspect.

The inventor has conceived, and reduced to practice, an engine for simplified generation of systems for broad area geospatial object detection using auto-generated deep learning models trained by actual and/or virtual images.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "orthorectified geospatial image" refers to satellite imagery of the earth that has been digitally corrected to remove terrain distortions introduced into the image by either angle of incidence of a particular point from the center of the satellite imaging sensor or significant topological changes inherent to the region of the earth that the image depicts. This correction is accomplished using a digital elevation model. One example of a digital elevation model in use today is Shuttle Radar Topography Mission (SRTM) 90 m DEM data set, but others of equal or greater precision have also been created using high definition stereoscopic satellite imagery of the same regions as are being analyzed or using topographical maps of sufficient detail available for that region. Geospatial images used as part of the invention may be orthorectified using digital elevation model datasets obtained by any method known to the art.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

As used herein, "search and locate" refers to a general class of tasks wherein a set of images is searched for particular classes of stationary targets (such as buildings, tanks, railroad terminals, downed airplanes, etc.) or relocatable targets (such as missile launchers, aircraft carriers, oil rigs, earthmovers, tower cranes, etc). It is common that the set of images may be searched to find more than one class of targets (for example, to find all targets of military interest), although single target class searches may also be performed ("find all cars"). The second part of the search and locate task is to precisely locate any resulting targets of interest (where is the air base or refugee camp?).

As used herein, "image manipulation" refers to a way of generating artificial, "manipulated images" and respectively labeling them to simulate real geospatial images, such that a plurality of synthetic images may be automatically generated without the need for manual effort. Image manipulation greatly reduces the extensive manual effort currently required to extract and label existing data, even when it is relatively abundant. Further, image manipulation may be utilized to create synthetic data for an object class for rare or even theoretical items. By using synthetic data, any object that may be simulated, modeled or otherwise created by computer-aided design (CAD), may be searched by a preferred embodiment of the invention.

As referenced herein, "manipulated images" refer to synthetic images, which may be modeled, flattened, or otherwise virtually generated or modified images, to replicate real, existing orthorectified geospatial images created from image manipulation. These images may be used to generate a collection of training images for a searchable object class.

As used herein, "cache of pre-labeled geospatial images" refers to any source of a plurality of orthorectified geospatial image segments that have been pre-analyzed and have had instances of one or more objects of interest tagged or labeled in such a way that the recipient computer system is able to associate a specific region of that image with the object of interest for the purpose of subsequent identification of like objects. These images may be stored in an image database, either relational or flat file, or within a directory of image files, any of which may be stored on the same computer on which the images are being used, a storage device or storage system directly connected to that computer or may be on a computer or storage system connected to the recipient computer through any of the networking methods as are known in the art.

As used herein, "cache of multi-scale geospatial images" refers to any source of a plurality of overlapping orthorectified geospatial image segments that, due to optical differences at the time of capture or processing differences at the time of transmission, storage or analysis, show the same geographical region at different functional resolutions. There is the further requirement that the correspondence of coordinate system used to catalog these segments within the cache, whether proprietary or open, to standard geographic latitude and longitude coordinates be known so that the location being analyzed on a given image segment from the cache is known at all times. These images may be stored in an image database, either relational or flat file, or within a directory of image files, any of which may be stored on the same computer on which the images are being used, a storage device or storage system directly connected to that computer or may be on a computer or storage system connected to the recipient computer through any of the networking methods as are known in the art.

As used herein, "image analysis" refers to the analysis of images obtained from one or more image sensors; generally, a single analysis task focuses on a set of images of a single region of interest on the earth, but image analysis may be done on multiple contiguous regions as captured by several image sensors. Satellite and aerial imagery are common examples of imagery that are subjected to large scale image analysis.

As used herein "image correction and optimization module" refers to a set of programming functions that during its operation receives a plurality of orthorectified geospatial images from a cache of pre-labeled geospatial images, normalizes these images to account for image quality differences which include but are not limited to variations in color balance, brightness, and contrast. This module also analyzes images for aberrations which might include cloud cover, lens artifact, mechanical obstruction of portions of the image and the software within the module may then reject the image from analysis when certain pre-set thresholds are exceeded.

As used herein "category" refers to a set of specific objects that are of the same type and function, but which may vary to some degree in appearance. An example of this might be the United States Capitol Building, the White House and the Pentagon in Washington D.C. all appear different in geospatial images but are all in the category "buildings." Another example might be that the Airbus 310, Lockheed L1011, Boeing 727, Boeing 777 and Boeing 747 all differ in size and fine level configuration, but are all in the category "airliners."

Conceptual Architecture

FIG. 1 is a diagram of an exemplary architecture 100 for a software engineered engine for simplified generation of systems for automated classification of objects in broad area geospatial images that uses the deep learning model and machine learning classifiers, according to an aspect. The engine to generate accurate systems for classification of objects of interest from broad area geospatial images may be broken down into three sub-assemblies: The object model creation sub-assembly 111; the machine learning classifier element training and verification sub-assembly 112; and use of the trained machine learning classifier elements to identify the trained objects on unanalyzed geospatial images 113. A plurality of training images labeled for presence of the object to be searched as selected by a campaign analyst 190 are generated in the training image synthesis module 145 as described in greater depth in FIG. 9, 900, 950. Briefly, a 3D model of the object to be searched is selected from a cache of such models (not drawn). This 3D model may be flattened to a 2D model image from an overhead perspective and then overlaid into a geospatial image. This synthetic image may then be compared to a real image 150, 190 comprising the object in the same orientation and, if recognized as the same object, a plurality of synthetic geospatial training images overlaid with the model object in several orientations and modified to recreate multiple factors such as but not limited to geographic locations, environmental factors, seasonal effects, and or shadowing effects accounting for sun angle, time of day, year as well as shadowing from localized light sources among other factors know to those skilled in the field. The object of interest may then be digitally demarcated for use in object feature selection by the object model creation sub-assembly 111 and for machine learning classifier element training and verification. Training images, either synthetic as described or unmodified geospatial images that have been manually analyzed and the object demarcated, are placed in a training image data store 110.

During object model creation 111 the analyst may introduce multiple images in which the object to be searched is clearly demarcated such that the object feature extraction module encounters the object to be searched is present in many different orientations and under a plurality of environmental conditions. Concurrently, a plurality of training geospatial images with a plurality of objects, at least some of which closely resemble the campaign search object (confounding objects) may be released into the object model creation assembly and clearly labeled as "negative samples" to assist the selection of object features highly specific to the search object to the exclusion of both confounding irrelevant and visually distinct objects during optical model generation. Prior to use in the object feature extraction module 115a image segments both for positive and negative feature selection from the cache of pre-labeled geospatial image segments 110 may undergo one or more steps of digital image correction and optimization 115a. A digital correction that may be done to image segments to be used by deep learning model training module is conversion from color to grayscale as this correction reduces image segment complexity, which aids in the feature selection process. In a preferred embodiment of the system the conversion is done by first converting the image from the RGB colorspace to the YCrCb colorspace and then discarding all but Y channel data which results in a grayscale image of tonal quality known to work well in deep learning model training used in the invention. The method of color to grayscale image conversion outlined here is meant only to be exemplary and should not be seen to limit conversion method that may be used, including the absence of this color to grayscale conversion in the training image preparation process. Another type of image correction that may be employed to prepare pre-labeled geospatial images for use in feature selection for object model generation is histogram normalization which often increases image contrast and serves to reduce the effects of exposure by producing sets of image segments with similar dynamic range profiles prior to use in feature extraction 120. Examples of histogram normalization filters that may be used to prepare geospatial images for training are linear histogram normalization, histogram equalization, adaptive histogram equalization, and contrast limiting adaptive histogram equalization. One skilled in the art will realize that while the use of these image histogram manipulation methods may produce image segments significantly better suited for the object feature extraction 120 during object model creation 125, the system described herein does not absolutely rely on histogram normalization in its generalized form or and of the exemplary histogram manipulation methods specifically. In addition to or in lieu of to those mentioned in some depth, image filters such as Gaussian, median filter, and bilateral filter to enhance edge contrast may be applied to pre-labeled geospatial image segments as is common in the art, however the listing of these filters is meant only to provide examples and should not be taken to bar the use of other filters that are not listed as part of the aspects. Upon programmatic analysis of features belonging to the search object in comparison to features found in irrelevant, visually unrelated and visually similar irrelevant objects, the object model creation sub-assembly 111 will generate at least one model derived from the unique features of the search object to be employed during the subsequent machine deep learning stage of the aspect using the object models creation module 125.

Figure 5:
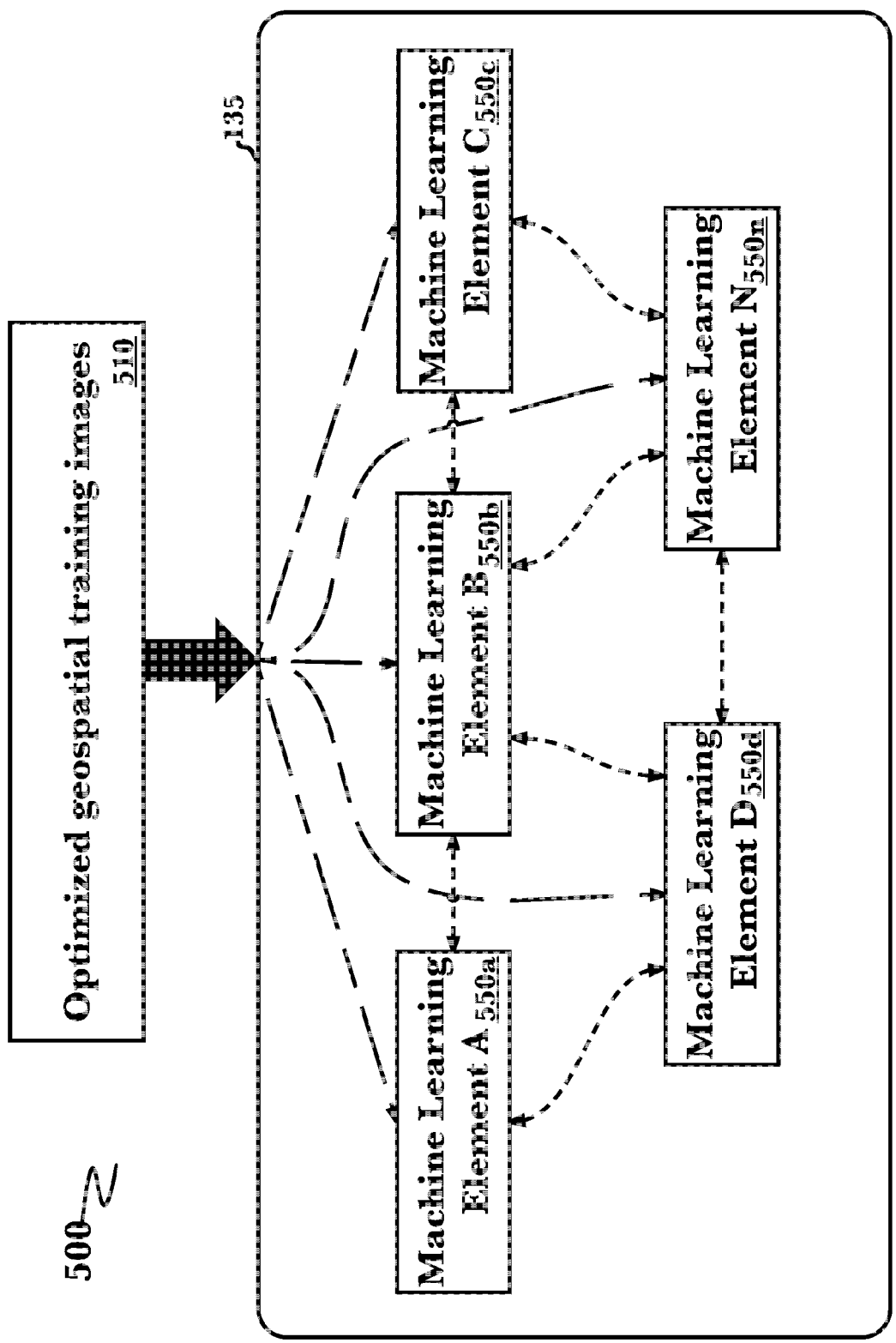
FIG. 5 is a diagram that illustrates the training of machine learning identifiers using an aspect.

At least one of the generated models from the object model creation subassembly 111 may be employed to train a model mediated object classification module 165 by a machine learning classifier element training and verification sub-assembly 112. The embodiment may select a model for use based upon pre-programmed parameters stemming from previous campaign successes although many other methods of selection known to those skilled in the art may also be used 130. Both supervised and unsupervised learning is employed at this stage using demarcated images retrieved from a training image data store 110. Digital correction and optimization may be done 115b to image segments to be used by a model training module 135 such as but not limited to, conversion from color to grayscale as this correction reduces image segment complexity, which aids in the training process. In a preferred aspect of the system the conversion is done by first converting the image from the RGB colorspace to the YCrCb colorspace and then discarding all but Y channel data which results in a grayscale image of tonal quality known to work well in deep learning model training used in the embodiment. The method of color to grayscale image conversion outlined here is meant only to be exemplary and should not be seen to limit conversion method that could be used, including the absence of this color to grayscale conversion in the training image preparation process. Another type of image correction that may be employed to prepare both pre-labeled and non-labeled geospatial images for use in training is histogram normalization which often increases image contrast and serves to reduce the effects of exposure by producing sets of image segments with similar dynamic range profiles prior to use in training of the model training module 135. Examples of histogram normalization filters that may be used to prepare geospatial images for training are linear histogram normalization, histogram equalization, adaptive histogram equalization, and contrast limiting adaptive histogram equalization. One skilled in the art will realize that while the use of these image histogram manipulation methods may produce image segments significantly better suited for the supervised stage of deep learning of machine learning classifiers 135 which may act individually or in combination as also illustrated in FIG. 5, the aspect described herein does not absolutely rely on histogram normalization in its generalized form or and of the exemplary histogram manipulation methods specifically. In addition to or in lieu of to those mentioned in some depth, image filters such as Gaussian, median filter, and bilateral filter to enhance edge contrast may be applied to pre-labeled geospatial image segments 115b as is common in the art, however the listing of these filters is meant only to provide examples and should not be taken to bar the use of other filters that are not listed as part of the embodiment. Supervised learning, which may take place in a model training module 135, comprises the introduction of images in which the object of interest is clearly demarcated with the analyst monitoring object classification success rate although some unlabeled images known to have the object present may be used. In unsupervised learning which may also take place in a model training module 135, a large plurality of images, many of which include the object of which some may be demarcated while others may be unlabeled but contain the object and still others may not contain the object, but may contain irrelevant and even confounding irrelevant objects, objects felt to visually resemble the object of interest in some way, but are not of interest to the campaign. For example, if the campaign is to determine presence of tanker trucks, confounding objects may comprise flatbed trucks, box trucks, and rows of parked passenger vehicles among other objects visually similar to tanker trucks but not listed here. As the name implies, unsupervised learning may occur with minimal analyst intervention and monitoring, review of the session possibly occurring only after its completion to assess the efficacy of object classification tuning brought about and the endpoint fidelity of the trained system at the end of the process. Depending on the complexity of the search object and training success, further rounds of supervised and unsupervised training may be undertaken or, in some cases, another model generated by the object model creation subassembly 111 may be substituted 130 and training repeated to attain the specifications of the campaign. There may also be a separate round of object identification fidelity testing 140, depending on such factors that may range from the design of the campaign, the desire of the analyst or the complexity of the search object, to expected background conditions (ex. special atmospheric or lighting conditions at time of geospatial image sampling, density confounding objects such as classifying tanker trucks in a congested area with many box, flatbed and other similar machinery present, or other situation known to those skilled in the field to make object identification more difficult).

The final sub-assembly of the engine involves use of the newly trained model mediated classification module 165 in monitored production use 113. Trained machine learning classifier elements 165 to identify the trained search objects on unanalyzed geospatial images 155 which may have been optimized using previously mentioned desaturation and histogram normalization filters among others. Geospatial images used may come from multiple caches originating from collection systems with widely different specifications and therefore may differ greatly in resolution scale in addition to the previously addressed chromatic and spectral differences 160. These production images may thus be normalized during analysis using a multi-scale sliding window filter (see FIG. 8) to equalize the resolution scale of the geospatial image region under analysis. Alternatively, the campaign analyst may choose a sub-region of a geospatial image that is felt to most likely have the search object and convert the sub-region to a resolution scale equal to that of the training images 160 as resolution is an important controlled factor for successful object classification. Identification of the search object within a segment of a geospatial image may result in the recording of a unique identifier for the point where the object is found such as the longitude and latitude and the number of objects present, although use of other identifiers is possible. These object search related data are then presented to campaign analysts in a pre-designated format 170.

Figure 2:
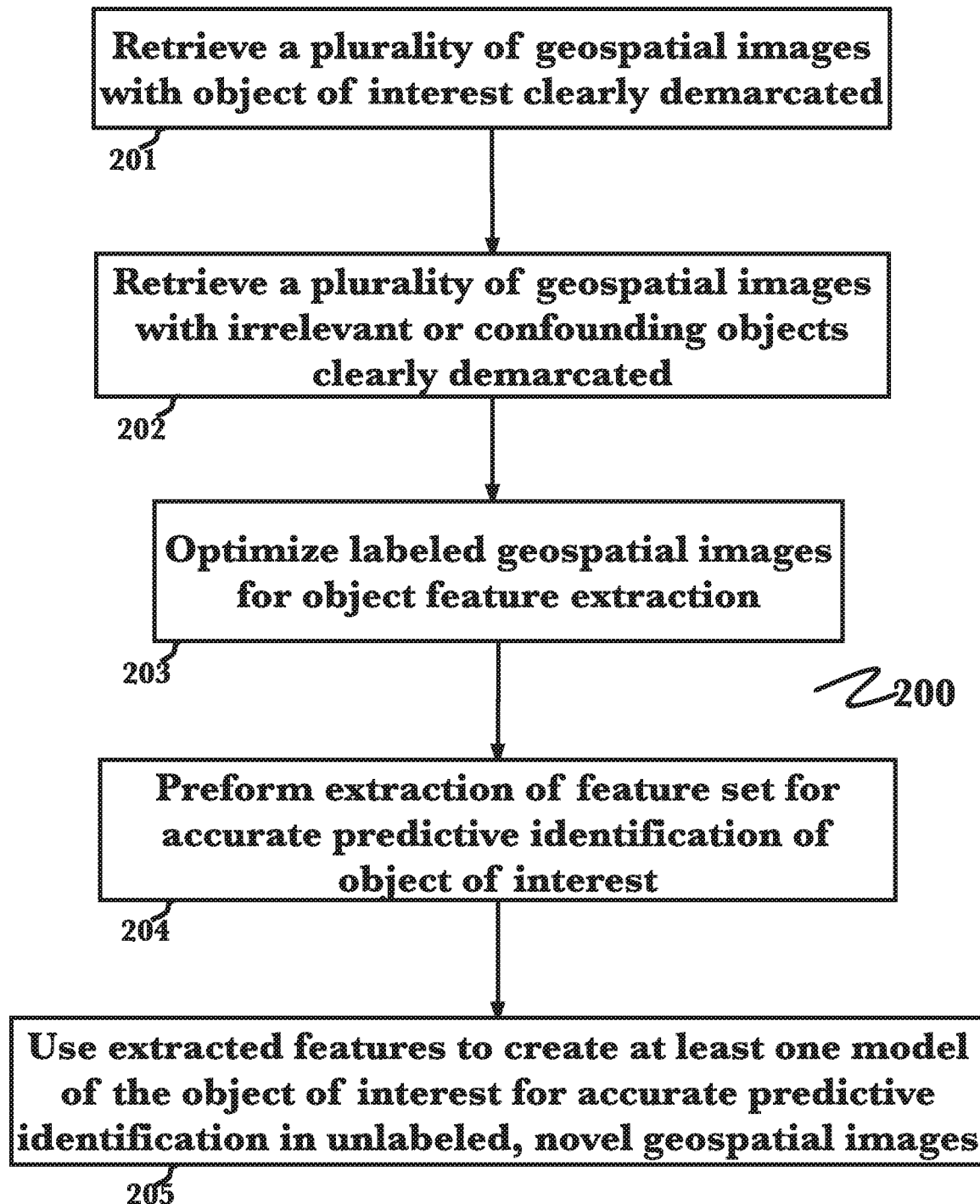
FIG. 2 is a process flow diagram of a method for feature selection from objects to be identified during geospatial image analysis that uses the deep learning model and machine learning classifiers using an embodiment.

FIG. 2 is a process flow diagram of a method for feature selection from objects to be identified during geospatial image analysis that uses the deep learning model and machine learning classifiers using an embodiment 200. To select features that may be useful in classifying a specific object of interest to a search and locate campaign, training images where the object of interest which is to be identified by the trained module are clearly labeled are used 201. Features are selected by the aspect using unique combinations such as but not limited to shape, texture, color and spectral properties. Feature selection may rely on the use of both positive samples, where the object of interest is presented in a plurality of orientations and lighting effects, the presence and location of the object clearly demarcated for system training and the use of negative samples, where geospatial images may comprise labeled objects that appear completely visually distinct from the object of interest to assist in the construction of a set of features that are not present on the search object, and may also include a plurality of pre-demarcated objects that are not the search object but visually closely resemble the search object, for example fighter jets, prop driven passenger craft and large cargo planes, prop or jet driven when the search object to be classified is passenger jets. This is particularly important where the feature differences between the search object and objects to be excluded are small in number as it provides not only features that may identify the search object, but also features which may exclude visually related irrelevant objects 202. All images are then normalized and optimized as previously described in FIG. 1 for the feature selection purpose 203. The embodiment object feature extraction module 120 then works to select visual features to predictively best isolate the campaign search object from all other possible objects that may be found in geospatial images using at least one round of supervised learning with a plurality of clearly demarcated positive samples and negative samples and unsupervised learning with a large plurality of synthetic and unmodified training images 204. Once training is completed one or mode classification models, groupings of visual relationships and rules (features) uniquely found on the search item in geospatial images of controlled resolution as well as groupings of visual relationships and rules (features) never found on the search object are generated for use in training an aspect to automatically classify the search object in unanalyzed production geospatial images 205.

Figure 3A:
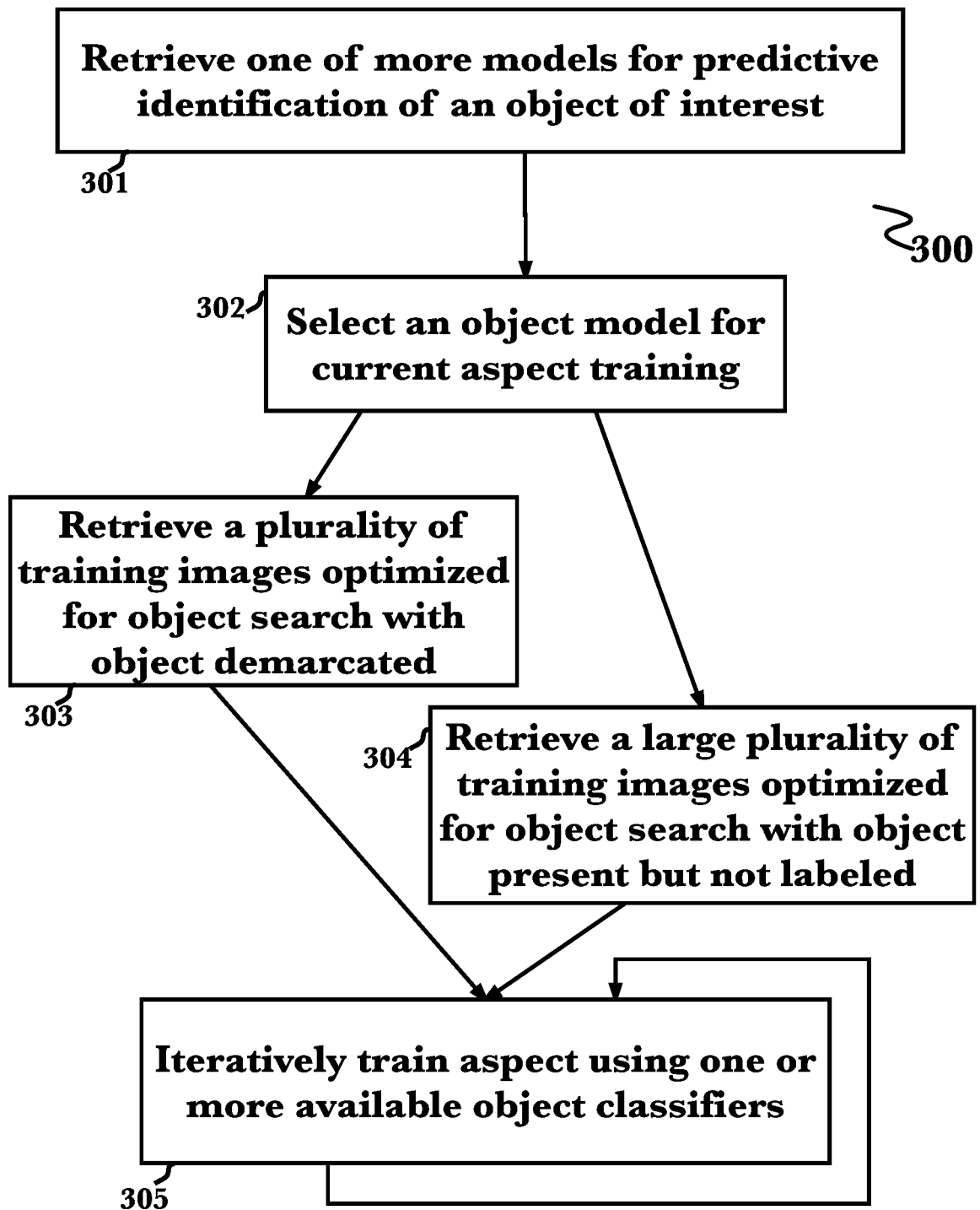
FIG. 3A is a process flow diagram of a method for training of machine learning classifiers for later use in production geospatial image analysis using an aspect.

FIG. 3A is a process flow diagram of a method for training of machine learning classifiers for later use in production geospatial image analysis using an aspect 300. Machine learning classifier training begins with the retrieval 301 and selection 302 of one of the object models generated by the object models creation module 125. With the selected model active in the training aspect, a plurality optimized training images where the object of interest, present in multiple orientations is clearly labeled 303 which are used to iteratively train one or more deep learning object classifier elements which may make use machine learning paradigms such as but not limited to convolutional neural network, vector support machines or random forest filters among other machine learning methods known to those skilled in the art 305. To increase the number of training images available, a great plurality of training images where the search object is present but not labelled may be used to further train the machine learning elements that may eventually be used for search object classification in a production setting 304.

Figure 3B:
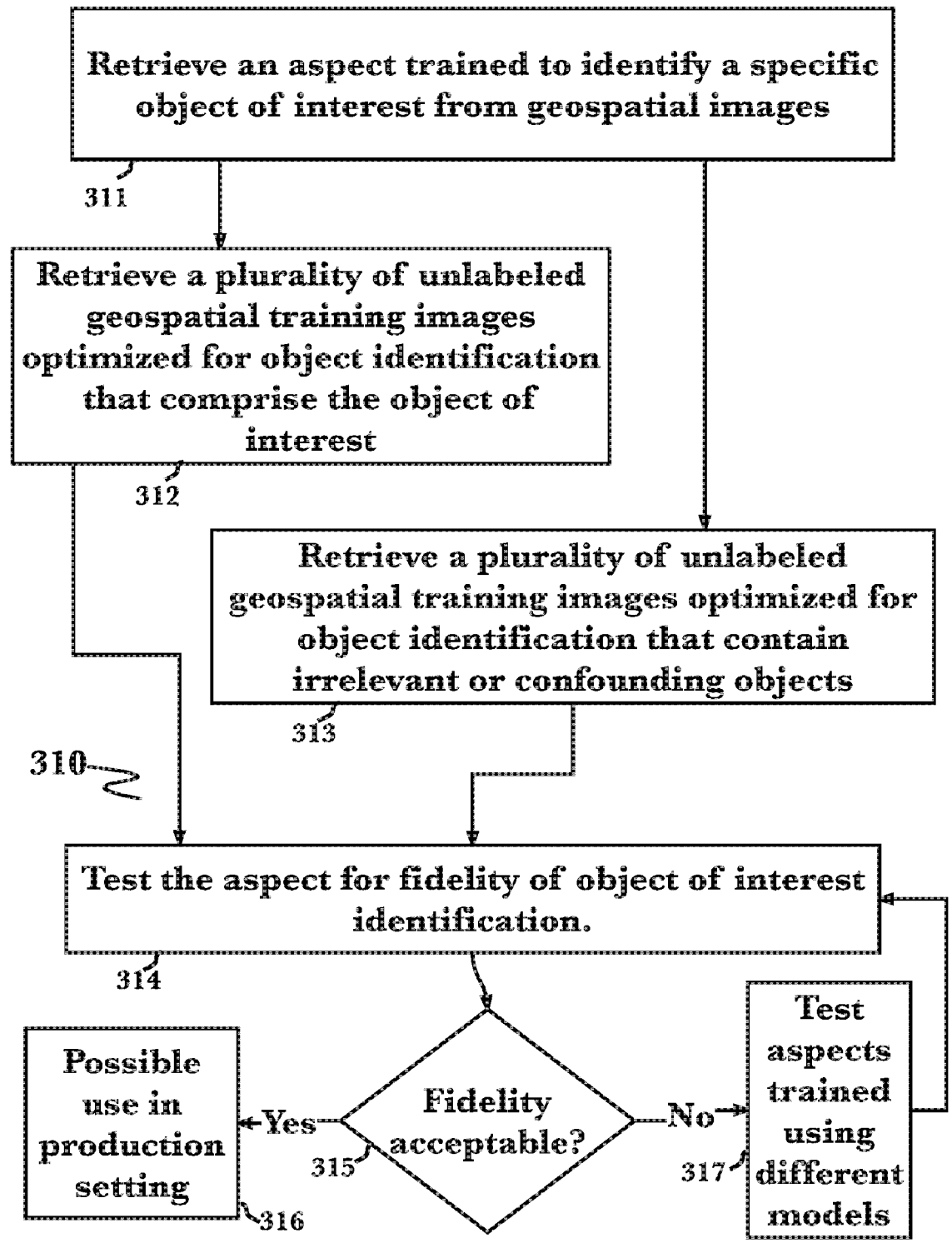
FIG. 3B is a process flow diagram of a method for confirming object identification fidelity of trained machine learning classifiers prior to later use in production geospatial image analysis using an aspect.

FIG. 3B is a process flow diagram of a method for confirming object identification fidelity of trained machine learning classifiers prior to later use in production geospatial image analysis using an aspect 310. To confirm the specificity of the trained machine learning element(s) that make up the search object specific trained model mediated object classification module 165, the aspect is selected 311 and subjected to testing using a plurality of training geospatial images that have 312 or do not have the search item present within them and may instead comprise an image with a confounding object to confirm fine specificity 313. Test 314 classification specificity is then measure to determine whether fidelity is high enough for campaign specifications 315. If specificity is at or above requirement, the trained model mediated object classification module may be used for the production campaign 316. Otherwise, further training may be undertaken with the same object identification module model or a second model may be chosen, if available 317.

Figure 4:
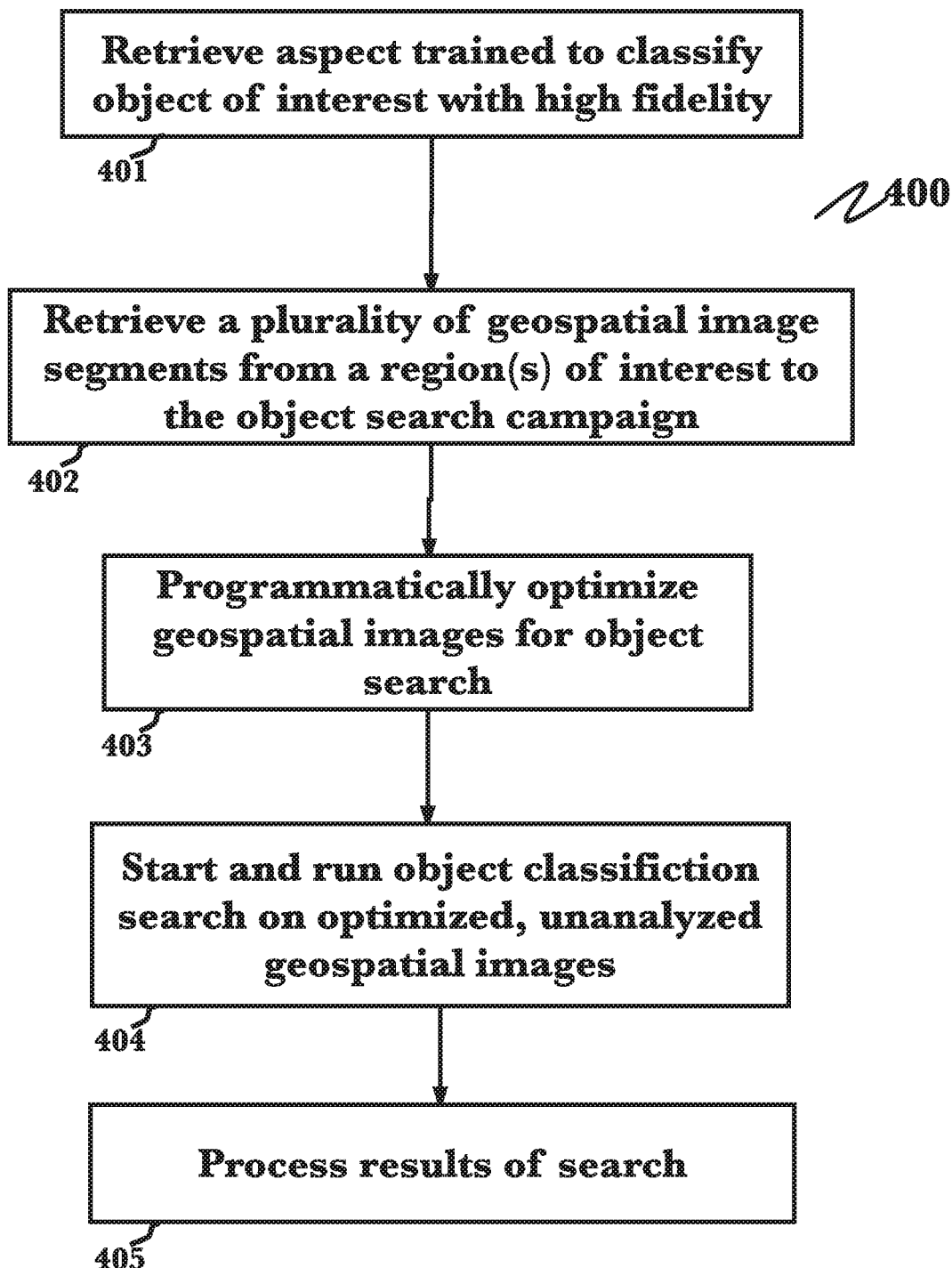
FIG. 4 is a process flow diagram of a method for employing newly trained machine learning classifiers to identify the trained object in production geospatial image analysis using an aspect.

FIG. 4 is a process flow diagram of a method for employing newly trained machine learning classifiers to identify the trained object in production geospatial image analysis using an aspect 400. Once trained to the level of specificity needed, a trained model mediated classification module may be retrieved into operation 401 and then used to search for the object of interest in a plurality of unanalyzed geospatial image segments from a geographical region of interest to the search campaign 402. These unanalyzed geospatial images may be programmatically optimized for object identification which may include use of a multi-scale sliding window function to place the image in the resolution for object search 403. Once the object search and classification using the trained machine learning classifiers is completed 404, data gathered about the search objects found which may include, among other information, latitude and longitude coordinates, are presented to the analyst in a format pre-designated by the campaign author 405.

FIG. 5 is a diagram that illustrates the training of machine learning identifiers using an aspect 500. Training starts with the retrieval of a plurality of training images 510 which may be real or synthesized as described in FIG. 9A and FIG. 9B. These training images may either be labeled or unlabeled. A sub-set of these retrieved images may not have the search object. In an aspect, training occurs within the model training module illustrated in FIG. 1, 135 Within the model training module 135, training images may be routed to one or more machine learning elements 550a-550n depending on the design of the campaign and the combination of machine learning protocols found to work optimally for the search object. Machine learning elements may be running protocols for one of the machine learning algorithms known to those skilled in the art such as but not limited to vector support machines, random forest, Bayesian network, native Bayes classifier, and convoluted neural network. Search object classification may use a single machine learning element, for example machine learning element C 550c, or may use multiple machine learning elements, for example machine learning element B 550b and machine learning element C 550c in a series that leads to the most accurate and reproducible identification of the search object. For example, machine learning element A 550a running the vector support machines protocol may be used followed by machine learning element B 550b running the random forest protocol. Of course, any progression of machine learning protocols may be used in any order depending on the requirements of attaining reliable and reproducible classification of the current search object.

It should be noted that not all possible connections between the machine learning elements have been drawn for the sake of presentation clarity. Search object classification data may flow directly between any machine learning element 550a-550n in any order required for optimal search object classification according to the aspect. While ensembles of only up to two machine learning elements have been described for presentation brevity, it should be understood that there is no programmatic limit on the number of machine learning elements that may participate in an ensemble and no design restriction that prevents a single machine learning element from participating twice in the same ensemble should optimal search object classification dictate such.

Figure 6:
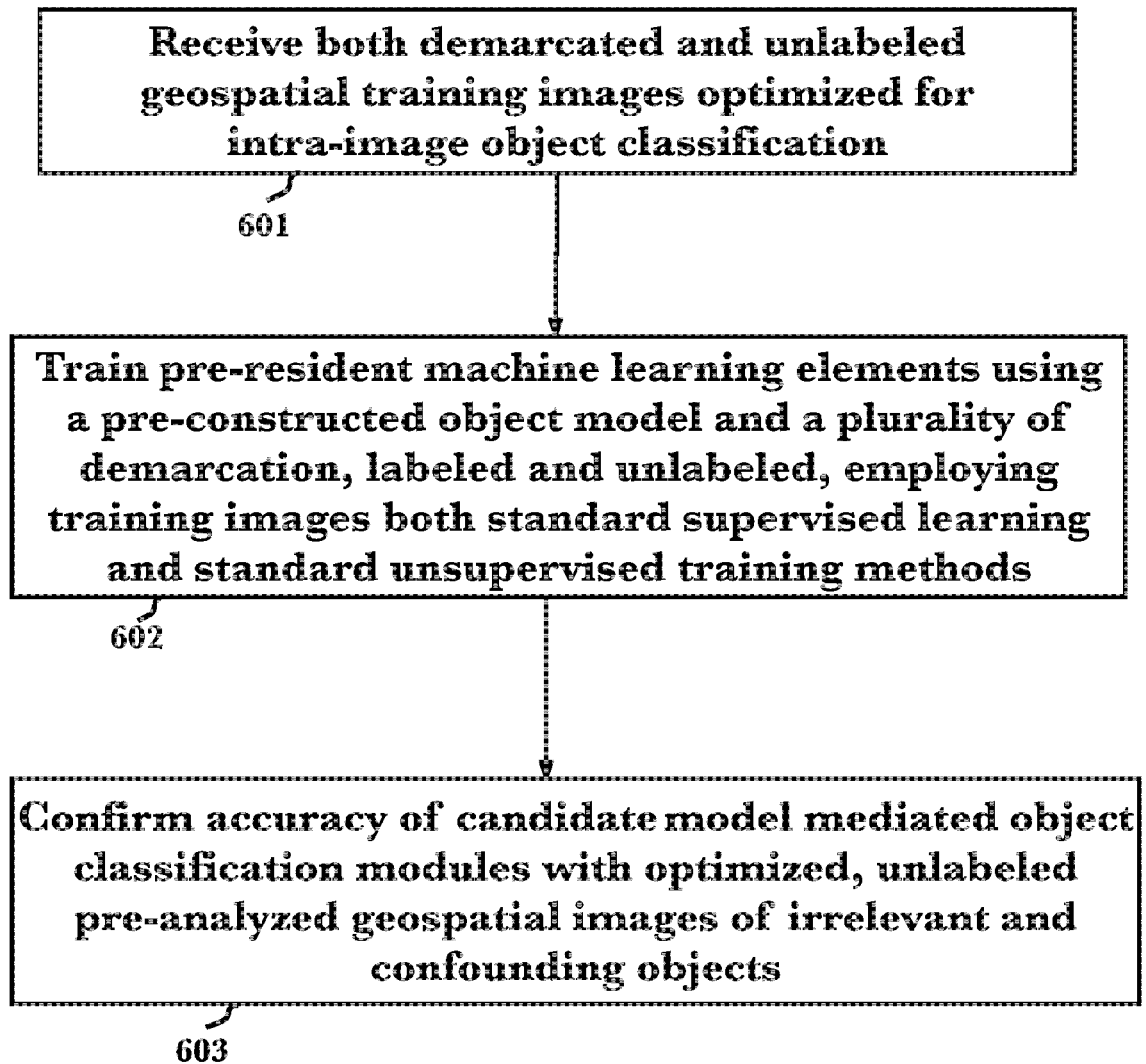
FIG. 6 is a process flow diagram of a method for training and verification of machine learning classifiers for later use in production geospatial image analysis using an aspect.

FIG. 6 is a process flow diagram of a method for training and verification of machine learning classifiers for later use in production geospatial image analysis using an aspect 600. Training progresses as first a plurality of optimized orthorectified, geospatial images a number of which may be synthetically generated (see FIG. 9A and FIG. 9B), all bearing a labeled example of a chosen campaign search object, are provided to a model training module (FIG. 1, 135) followed by mixtures of both labeled and unlabeled optimized orthorectified, geospatial images 601. Within the model training module, programming functions comprising multiple machine learning protocols such as but not limited to vector support machines, random forest, Bayesian network, native Bayes classifier, and convoluted neural network among other machine learning protocols known applicable by those skilled in the art, are employed either individually or in ensemble as required for optimally reliable and reproducible classification of the campaign search object. Ensembles may employ two or more machine learning functions during search object training and there are no aspect design restrictions against reuse of the same machine learning protocol should object classification reliability and reproducibility dictate such iterative application 602. Additionally, trained candidate model mediated classification modules may be tested for reliable and reproducible search object classification using a plurality of unlabeled optimized orthorectified geospatial images that include the search object in many different orientations lighting and environmental conditions as well as irrelevant and confounding objects that have visual features that resemble those of the search object also in a plurality of orientations, lighting and environmental settings 603.

Figure 7:
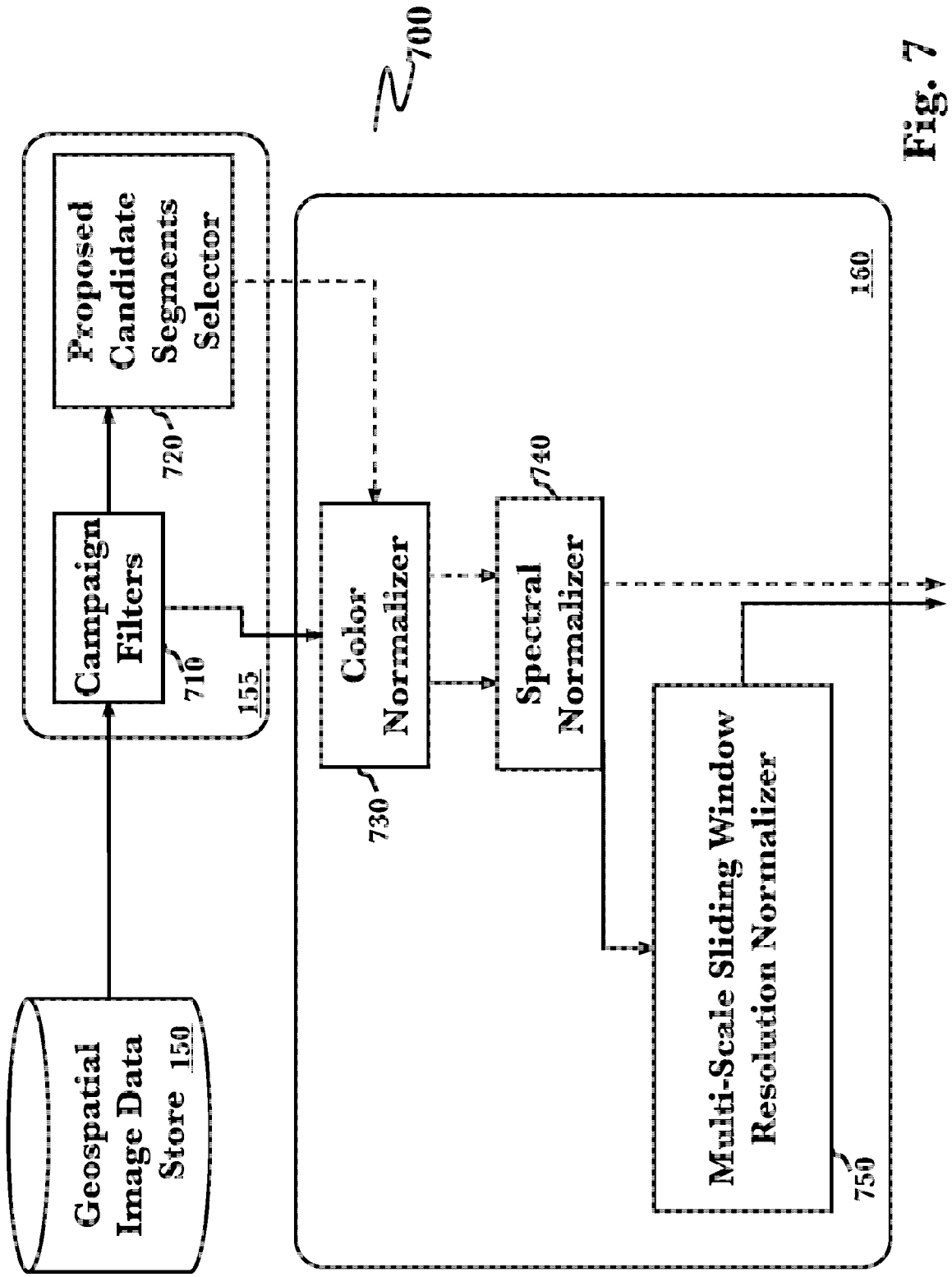
FIG. 7 is a diagram that illustrates the optimization and normalization of geospatial images prior to object identification using an aspect.

FIG. 7 is a diagram that illustrates the optimization and normalization of geospatial images prior to object identification using an aspect 700. Geospatial images must be optimized and normalized prior to analysis for the presence of a search object. Images in one of more image stores 150 that are from a region or regions included in a search and locate campaign may undergo modification specific to that campaign during the selection process 710. Based upon the requirements of the campaign, the level of certainty regarding the predicted location of the search object and the pre-planning of campaign analysts, geospatial images may be subdivided into segments of resolution scale to allow object identification 720. The selected geospatial image or selected geospatial image segment may then undergo color correction to create working images with color tone similar to those of training images 730 and spectral normalization to create uniformity between campaign selected images and training images to promote optimal object classification success within the study image data 740. Upon completing this normalization, image segments that are already appropriately scaled 720 may be passed directly to the model mediated object classification module (see FIG. 1, 165) whereas geospatial images that are of differing resolution scale from training images may be analyzed employing a scale factoring multi-scale sliding window resolution normalizing filter 750, (See also FIG. 8) prior to object classification analysis.

FIG. 8 is a three panel diagram 800 that illustrates the operation of a sliding window module to translate the coordinate system used within the cache of geospatial images being analyzed and the geographical longitude and latitude system as part of the automated system (see FIG. 1, 113) for geospatial image analysis of the aspect. Establishment of the location of any identified objects of interest generally requires that conversion of the coordinate system used internal to the cache of multi-scale unanalyzed geospatial image segments 150 to the coordinates of earth latitude and longitude takes place. Cached orthorectified geospatial image segments, or tiles 810, are regularly stored in caches using cache-internal coordinate systems 811, 812 of which the tile map service system and the web map tile service are two standardized examples that the invention might encounter. It should be clear, however, that the mention of these two systems should not be construed as the only possible coordinate systems that method 400 might use, as the aspect does not depend on any specific system and tiles encoded by any coordinate system known to those skilled in the art may be used, provided that that system supplies a conversion pathway to geographical latitude and longitude and also includes scaling information. In one embodiment of this design, the image cache service might provide internal row and column numbers of an image segment's origin 813 in addition to a scaling factor of the segment that is supplied. From this segment-specific information and any additional cache coordinate system specification information, sliding window subroutines of the invention may easily and accurately convert from the cache's coordinate system to standard geographical longitude 821 and latitude 822 for any point of the image segment that is undergoing analysis 820. Specifically this is done by subroutines in the sliding window software module which, as the window of focus scans a first image segment for objects of interest 830, keeps track of the change in latitude and longitude using the equation $_{new}$=a sin(sin $_{old}$×cos+cos $_{old}$×sin×cos) for change in latitude and the equation $_{new}$=$_{old}$+a tan 2(sin×sin×cos $_{old}$×cos−sin $_{old}$×sin $_{new}$) for longitude where is latitude, is longitude, is bearing (clockwise from north) and is angular distance traveled ((scale corrected distance traveled/radius of the earth)) 831.

Figure 9A:
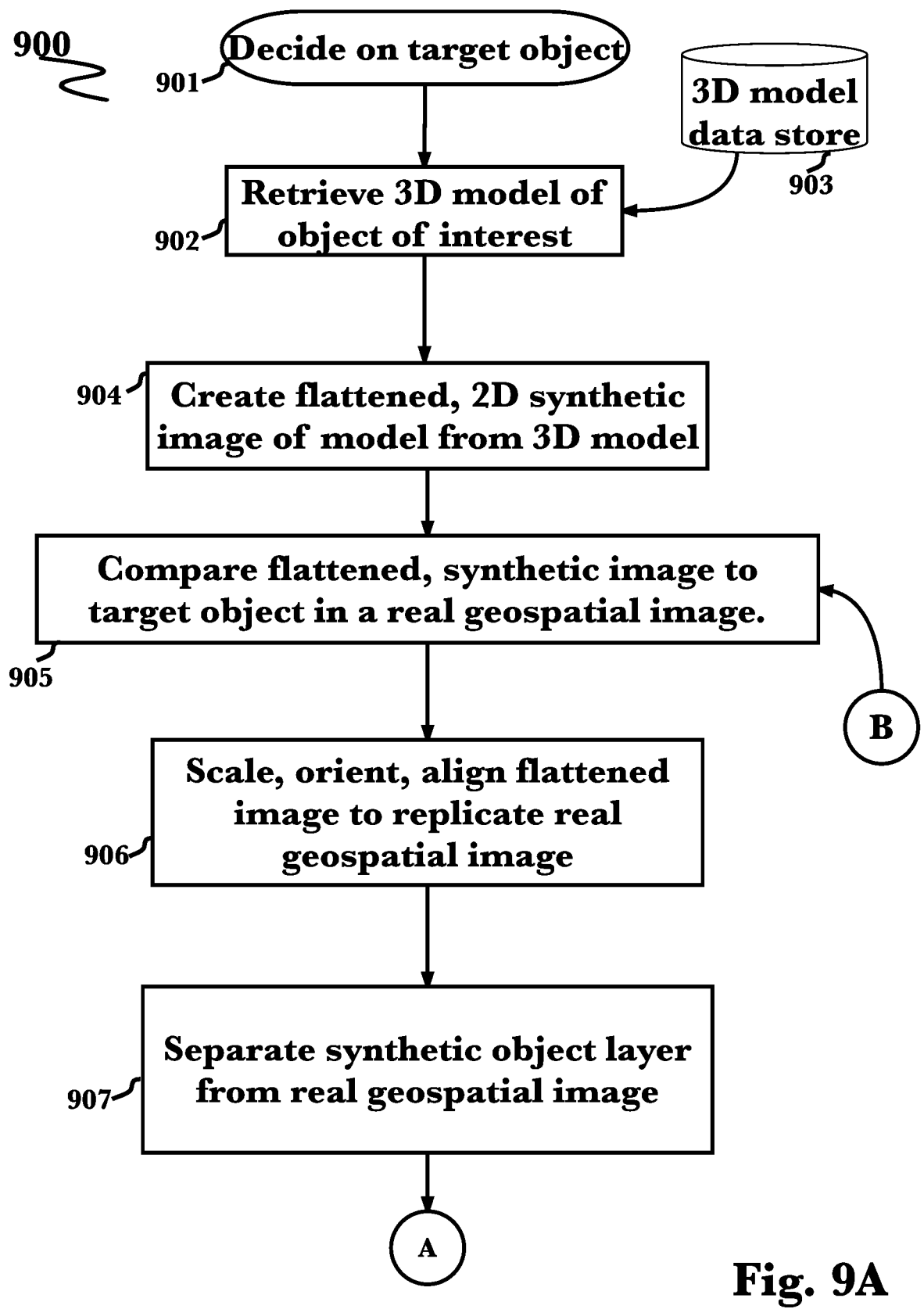
FIG. 9 is a two part, FIG. 9A and FIG. 9B, process flow diagram summarizing the generation of synthetic training geospatial images comprising the campaign object.
Figure 9B:
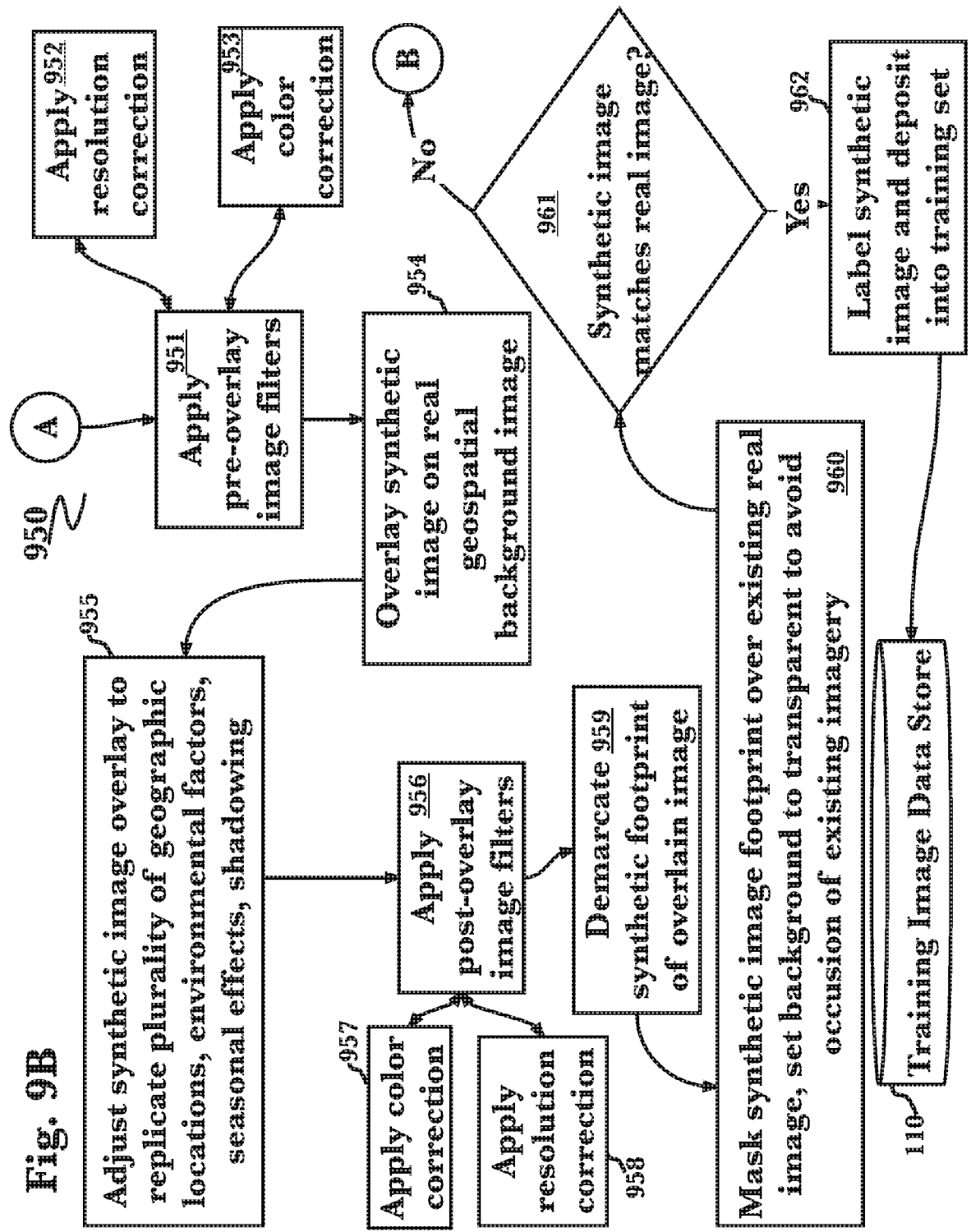

FIG. 9 is a two part, FIG. 9A, 900 and FIG. 9B, 950 process flow diagram summarizing the generation of synthetic training geospatial images comprising the campaign object for geospatial image analysis that uses a method similar to that of 200, described above; however, the deep learning models 135, 550a-550n and the image analysis software 113 are combined with an image manipulation software module 145 using an aspect. According to the embodiment, a search and locate function FIG. 9A, 901 is conducted to identify and locate an object or item of interest from orthorectified geospatial imagery, regardless of whether the object is real or imaginary, so long as the searched object of interest was, is or could be, now or in the future, tangible and occupy 3-dimensional space. Method 900, 950 allows for a "search and locate" action 901 to be executed on any pre-labeled searchable object or set of objects. Using method 900, 950, a synthetic image may be generated for a specified object or item of interest, as specified in the search function 901. Searchable objects may be retrieved from a database of modeled objects 903 in response to the search function 901 for the object of interest. By searching the 3-dimensional database of models 903, the training image manipulation software module 145 retrieves a 3-dimensional model 902 of the object of interest, creates a flattened 2-dimensional synthetic image 904 from the selected 3-dimensional model and compares 905 the 2-dimensional synthetic image 904 to real, geospatial imagery of the same object, such that the training image manipulation software module 145 may scale, orient, or and align the flattened 2-dimensional image to replicate 906 the real orthorectified geospatial image. Once the synthetic image has been initially replicated 906, the training image manipulation software module 145 separates the synthetic image layer from the real image layer 907, such that pre-overlay filters FIG. 9B, 951, color correction 953 and resolution correction 952 may be applied for initial tuning of the synthetic image to a plurality of backgrounds. Once the pre-overlay filters 951 have been applied to the separated synthetic image layer 907, the module 145 will again overlay the synthetic image on the real geospatial image 954 before adjusting the initial image to replicate a plurality of geographic locations, environmental factors, seasonal effects, and or shadowing effects accounting for sun angle, time of day, year as well as shadowing from localized light sources 955. Post-overlay image filters 956, such as color correction 957 and resolution correction, smoothing, blurring or pixelating 958, finalize the synthetic image before a synthetic footprint is demarcated 959. The synthetic footprint demarcation 959 is important as it may comprise not only the synthetic image but also any associated shadowing associated with the synthetic object. The demarcated synthetic image 959 is overlain onto existing real imagery background, and using a masking function 960 to set the background of the synthetic image to transparent such that existing imagery is not occluded. Finally, the software module 145 runs a check 961, to ascertain whether the synthetic image matches the pre-labeled real image, and if so, created a labeled synthetic image 962 to be deposited into a labeled corpus training set 110. Otherwise further adjustments to the synthetic object model may be made FIG. 9A, 905.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
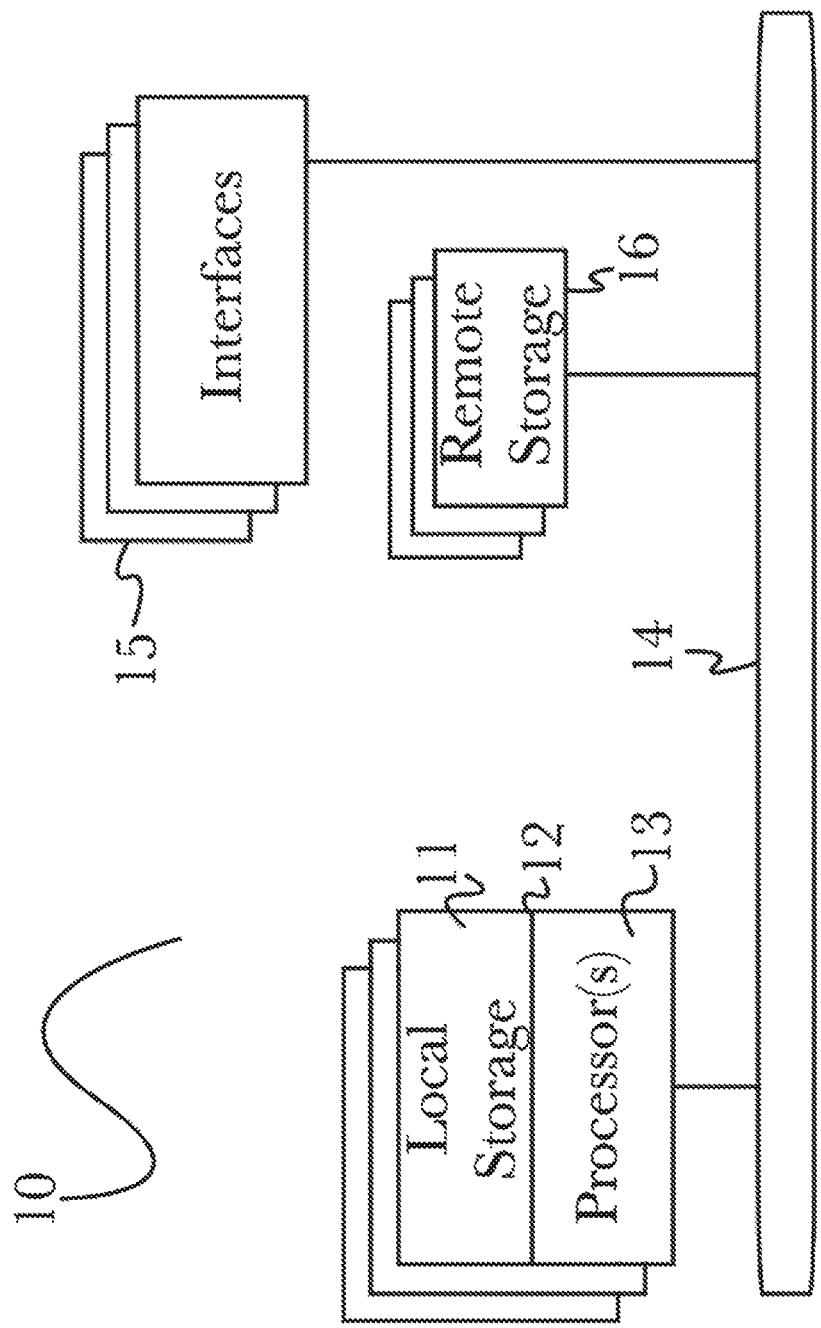
FIG. 10 is a block diagram illustrating an exemplary hardware architecture of a computing device used in various embodiments of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files comprising higher level code that may be executed by the computer using an interpreter (for example, scripts written in Python, Perl, Ruby, Groovy, or any other scripting language).

Figure 11:
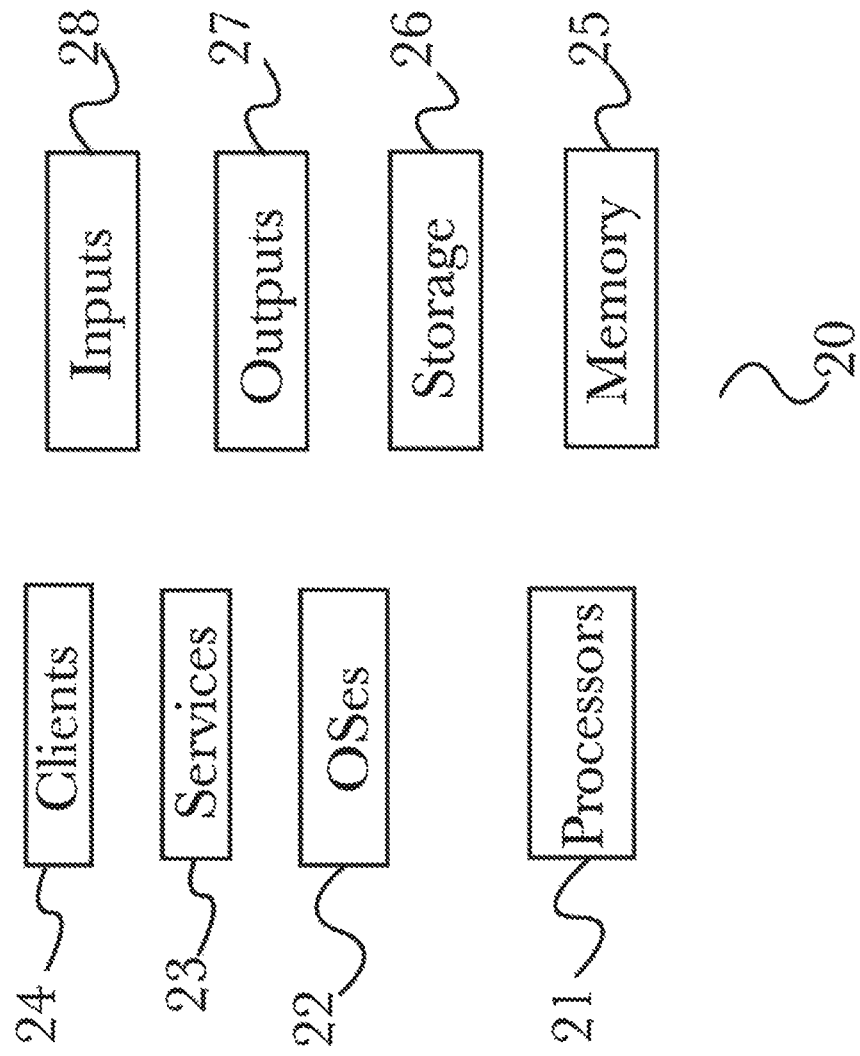
FIG. 11 is a block diagram illustrating an exemplary logical architecture for a client device, according to various embodiments of the invention.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
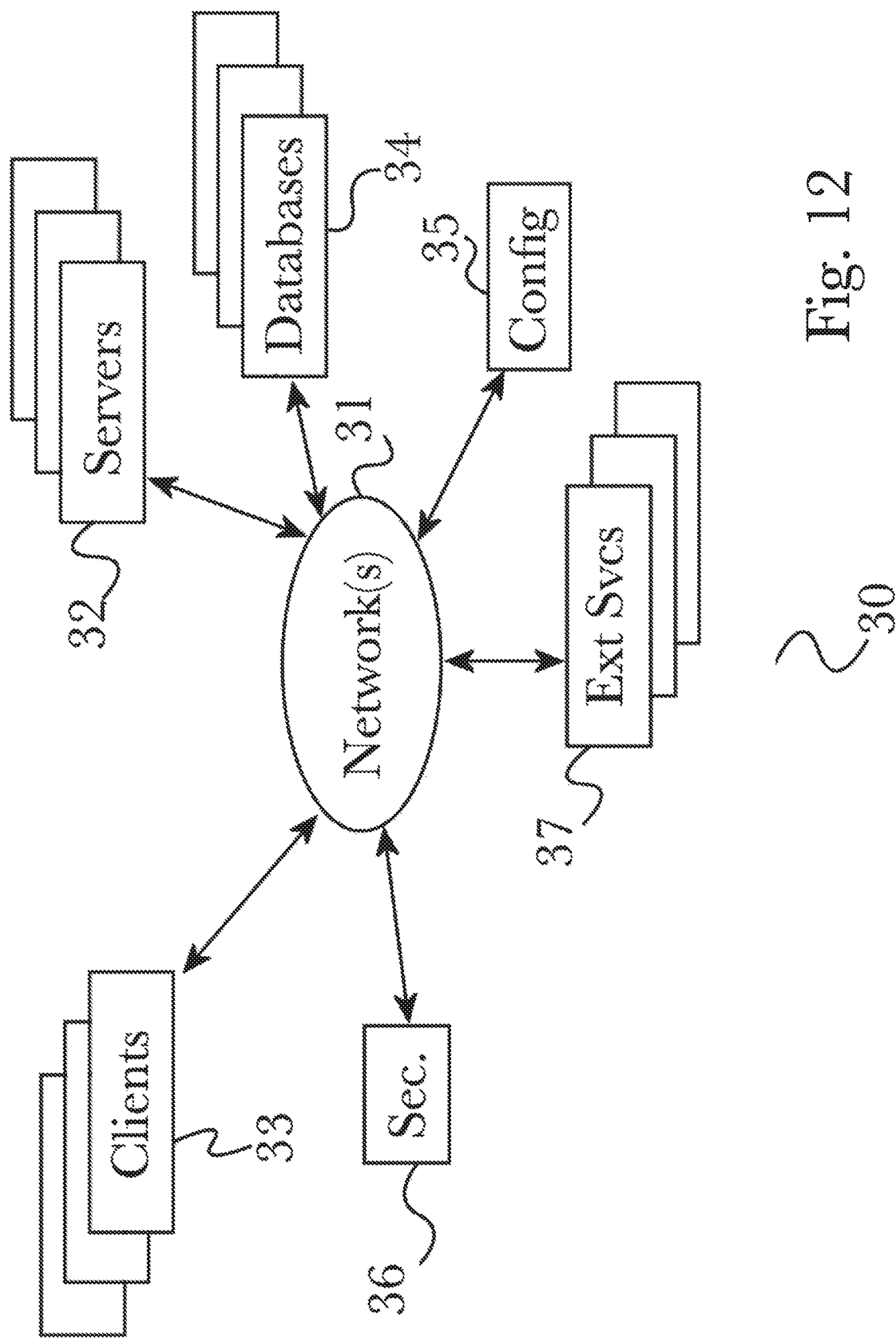
FIG. 12 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33.

Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
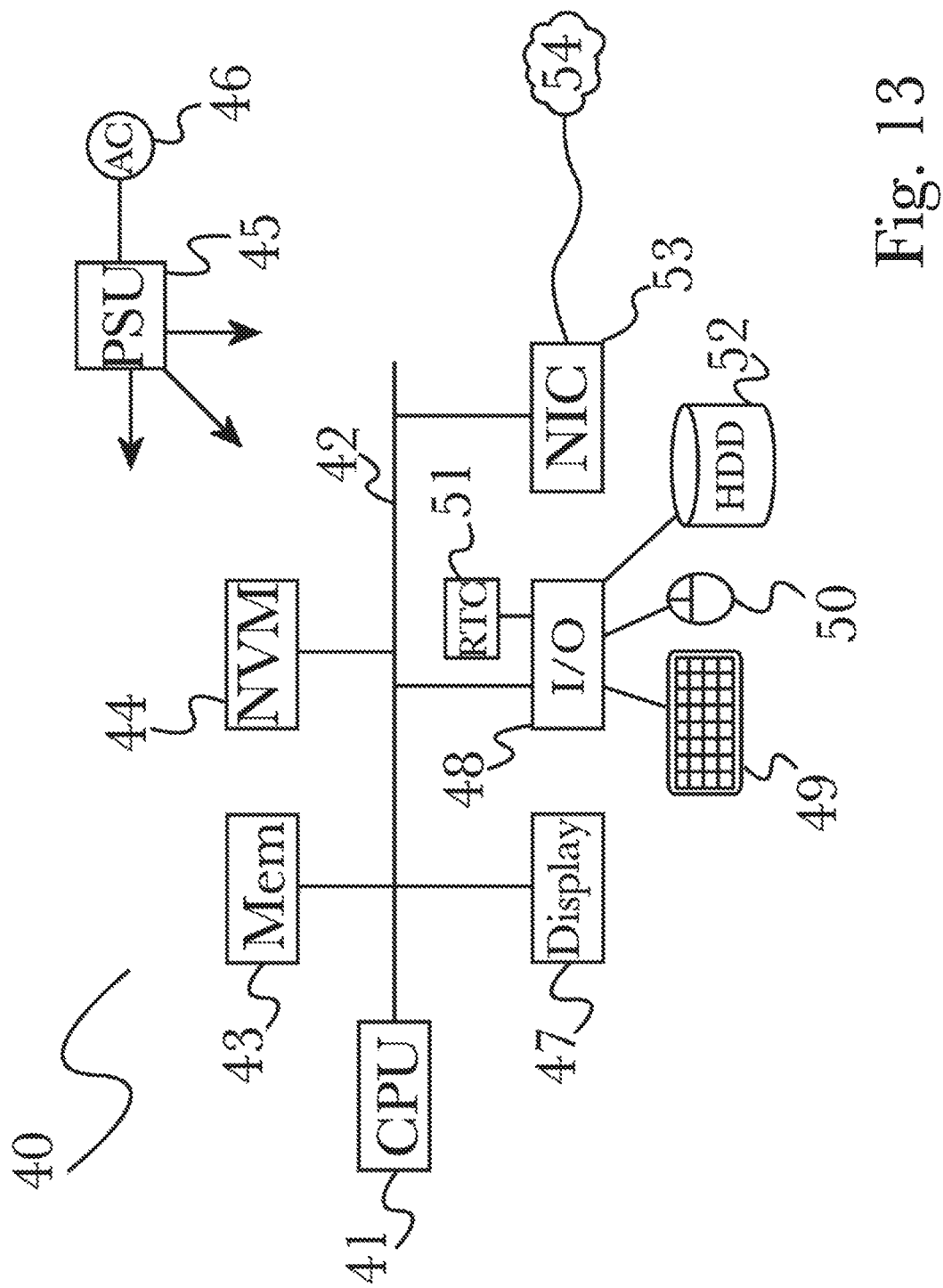
FIG. 13 is a block diagram illustrating an exemplary overview of a computer system as may be used in any of the various locations throughout the system

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for broad area geospatial object detection comprising:
   at least one computing device comprising a processor, a memory, a network interface, and a plurality of programming instructions stored in the memory and operable on the processor;
   an object model creation module comprising programming instructions operating on the processor of one of the computing devices to cause the respective processor to:
      receive a plurality of orthorectified geospatial images in which an object of interest has been identified;
      retrieve a plurality of orthorectified geospatial images wherein objects that are not the object of interest have been identified; and
      train an object classification model to classify only the object of interest;
   a machine learning classifier training and verification module comprising programming instructions operating on the processor of one of the computing devices to cause the respective processor to:
      accept the object classification model;
      retrieve a plurality of labeled and unlabeled orthorectified geospatial training images each containing at least one instance of the object of interest; and
      train a plurality of machine learning classifier elements, each running a machine learning protocol parameterized with the object classification model, using the plurality of labeled and unlabeled orthorectified geospatial training images; and
   a model-based object classifier comprising programming instructions operating on the processor of one of the computing devices to cause the respective processor to:
      retrieve the plurality of trained machine learning elements for the object of interest;
      analyze a plurality of resolution scale-corrected, unanalyzed orthorectified geospatial image segments for presence of at least one object of interest; and
      report the presence and location of any objects of interest found.

2. A method for broad area geospatial object detection, the method comprising the steps of:
   retrieving a first plurality of geospatial training images each containing at least one labeled instance of an object of interest, and a second plurality of geospatial training images that do not contain the object of interest;
   isolating a set of visual features unique to the object of interest using an object model creation module;
   employing the set of visual features unique to the object of interest to parameterize at least one machine learning classifier running at least one machine learning protocol, using a machine learning classifier element training and verification module;
   training the machine learning classifier elements to identify the object of interest using a plurality of training geospatial images with the object of interest labeled in one subset and not labeled in a second subset within the machine learning classifier element training and verification module;
   analyzing previously unanalyzed geospatial images for presence of the object of interest using the trained machine learning classified elements; and
   reporting the presence and location of any objects of interest found.

\* \* \* \* \*